United States Patent [19]
Kono et al.

[11] Patent Number: 5,436,090
[45] Date of Patent: Jul. 25, 1995

[54] GALVANIC CELL

[75] Inventors: Michiyuki Kono, Neyagawa; Shigeo Mori, Kyoto; Kazunari Takeda, Takatsuki; Shyuiti Izuti, Shiga, all of Japan

[73] Assignee: Dai-Ichi Kogyo Seigaku Co., Ltd., Kyoto, Japan

[21] Appl. No.: 119,214

[22] PCT Filed: Jan. 20, 1993

[86] PCT No.: PCT/JP93/00064

§ 371 Date: Sep. 21, 1993

§ 102(e) Date: Sep. 21, 1993

[87] PCT Pub. No.: WO93/14529

PCT Pub. Date: Jul. 22, 1993

[30] Foreign Application Priority Data

Jan. 21, 1992 [JP] Japan .................. 31451

[51] Int. Cl.$^6$ ........................... H01M 6/18
[52] U.S. Cl. ........................... 429/191; 429/192
[58] Field of Search ............. 429/192, 191, 194; 252/62.2; 204/421

[56] References Cited

U.S. PATENT DOCUMENTS

| | | | |
|---|---|---|---|
| 4,908,283 | 3/1990 | Takahashi et al. | 429/192 |
| 5,238,758 | 8/1993 | Lee et al. | 429/192 X |
| 5,264,307 | 11/1993 | Andrei et al. | 429/192 |

FOREIGN PATENT DOCUMENTS

| | | |
|---|---|---|
| 63-94563 | 4/1988 | Japan . |
| 1-169807 | 7/1989 | Japan . |

*Primary Examiner*—Anthony Skapars
*Attorney, Agent, or Firm*—Morgan & Finnegan

[57] ABSTRACT

A cell is obtained with use of a solid electrolyte prepared by dissolving a trifunctional terminal acryloyl-modified alkylene oxide polymer having a polymer chain represented by the following formula (1) and an electrolyte salt in a solvent, and then by crosslinking it by a radioactive ray irradiation and/or by heating. The solvent is used in a ratio of 220 to 950 weight % based on the above polymer.

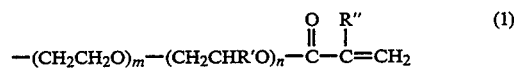

$$-(CH_2CH_2O)_m-(CH_2CHR'O)_n-\overset{O}{\overset{\|}{C}}-\overset{R''}{\overset{|}{C}}=CH_2 \quad (1)$$

(R' is an alkyl group having 1 to 6 carbon atoms, R'' is hydrogen or methyl group, and m and n are respectively 0 or an integer of at least 1 and m+n≧35.)

In a typical galvanic cell, a solid electrolyte combined with a positive electrode active material, which is obtained by mixing said trifunctional terminal acryloyl-modified alkylene oxide polymer with the electrolyte salt, the solvent and the positive electrode active material and crosslinking it by radioactive ray irradiation and/or heating, is used as a composite positive electrode and, between the positive electrode and a negative electrode, an electrode prepared by crosslinking a mixture of said trifunctional terminal acryloyl-modified alkylene oxide polymer, the electrolyte salt, the solvent and the positive electrode active material by radioactive ray irradiation and/or by heating is placed as a separator.

11 Claims, 3 Drawing Sheets

GALVANIC CELL

TECHNICAL FIELD

The present invention relates to a galvanic cell using a polymer solid electrolyte excellent in ionic conductivity.

BACKGROUND OF THE INVENTION

Recent tendency of microelectronics requires a smaller, lighter and thinner galvanic cell having a high energy density according to using the cell in the form of inclusion in electronic devices and unification with electronic elements and circuits as represented by the memory back-up powder source for various electronic devices. In the field of primary galvanic cell, small light galvanic cells such as lithium cell have been already used in practice. However, their fields of application are restricted. Here, the secondary galvanic cell by using a non-aqueous electrolytic solution to enable a smaller and lighter galvanic cell has been noticed as a galvanic cell replacing conventional lead cells and nickel-cadmium cells. However, no galvanic cell satisfying practical performances such as cycle characteristics and self-discharge characteristics of electrode active material has been found.

Here, we, inventors, have investigated the preparation of a thin galvanic cell (sheet cell having a thickness of 100 to 500 $\mu$m per unit cell) which is small and light and has a high energy density by using a thin membrane of an ionic conductive polymer. When a thin membrane of the above-mentioned ionic conductive polymer is used, it has become to be problems that the preparation of a thin membrane of metal lithium having a quality fully matching it is technically difficult to some extent and that the manufacturing process of the galvanic cell becomes complex. In addition, when it is used as a secondary galvanic cell, a problem has also occurred that the use of metal lithium is restricted because of the difficulties such as formation of lithium dendrite and passivation of the surface.

Thus, lithium metal-containing alloys such as lithium-aluminum, lithium-lead and lithium-tin alloys have been extensively investigated. However, as represented by lithium-aluminum alloys, these alloys are low in strength and hence the electrode is cracked or pulverized by repeated charge and discharge to be failed in the improvement of cycle characteristics.

As other methods for preventing formation of lithium dendrite, selection of the electrolyte salts and improvement of the separator have been tried. Though the prevention of lithium dendrite has been tried by laminating polypropylene nonwoven fabrics and glass fiber nonwoven fabrics conventionally used as a separator, it gives no substantial solution.

Accordingly, now in many research laboratories, those utilizing intercalation or doping phenomenon of layer compounds have been especially investigated as the electrode active material. As these cause no complex chemical reaction theoretically during the electrochemical reaction of charge and discharge, a very excellent charge-discharge cycle performance can be expected.

On the other hand, a liquid electrolyte, particularly an organic electrolytic solution containing dissolved ionic compound has been generally used as the electrolyte for the galvanic cells utilizing electrochemical reaction and the electrochemical devices other than the galvanic cell such as an electric double layer capacitor and an electrochromic element. However, a liquid electrolyte tends to cause leakage of the liquid from the parts, elution and evaporation of the electrode material and hence it causes problems including lack in long-term reliability and scattering of the electrolytic solution during the sealing process.

In order to improve the liquid leakage resistance and the storage stability, it is required to use an ionic conductive polymer having a high ionic conductivity, that is a solid electrolyte. However, when the conventional ionic conductive polymers are used, they may cause problems including complex manufacturing processes of the galvanic cell and restriction in use of metal lithium as mentioned above. Thus, it was difficult to provide a small light cell which is excellent in long-term reliability and safety and also has a high performance and a high energy density.

For example, the known solid electrolytes include a polymer solid electrolyte manufactured by a combination of a trifunctional high polymer having a terminal acryloyl-modified alkylene oxide chain, a low molecular alkylene oxide copolymer, polyvinyl chloride and an electrolyte salt, etc. (Japanese Laid-Open Patent Publication No. 177409 of 1991) and a solid electrolyte manufactured by a combination of a terminal acryloyl-modified alkylene oxide chain, an inorganic ionic salt and an organic solvent such as propylene carbonate, etc. (Japanese Laid-Open Patent Publication No. 94501 of 1988). However, these had problems in the volume and the mechanical strength, and a small light cell having a high energy density could not be prepared with them.

Here, an object of the present invention is to improve an ionic conductive polymer and thus to provide a galvanic cell which is excellent in long-term reliability and safety and also has a high performance and a high energy density though small and with no fear of liquid leakage.

DISCLOSURE OF THE INVENTION

We, inventors, have investigated to solve the above problems and have found that a solid electrolyte which is excellent in mechanical strength and has an electric conductivity comparable with conventional electrolytes and also shows no bleed-out of the solvent can be prepared by using a trifunctional terminal acryloyl-modified alkylene oxide polymer having an alkylene oxide polymer chain comprising not less than a definite number of monomer units as the polymer electrolyte, adding a solvent and an electrolyte in a specific ratio, and then crosslinking it by irradiation of radioactive ray such as light and electron beam and/or by heating, and that a highly efficient galvanic cell can be prepared by using it as a solid electrolyte for the galvanic cell to complete the present invention.

The galvanic cell according to the present invention is which is produced by using a solid electrolyte prepared by dissolving a trifunctional polymer in a solvent together with an electrolyte salt and crosslinking it by a radioactive ray irradiation and/or by heating. It is characterized in that the trifunctional polymer is a trifunctional terminal acryloyl-modified alkylene oxide polymer having a polymer chain represented by the following formula (1) as each functional polymer chain,

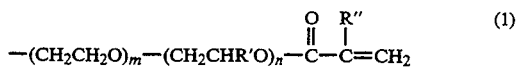

(1)

in which R' is an alkyl group having 1 to 6 carbon atoms, R" is hydrogen or methyl group, and m and n are respectively 0 or an integer of at least 1 and m+n≧35, and the used amount of the solvent is 220 to 950 weight % based on the trifunctional terminal acryloyl-modified alkylene oxide polymer.

In the present invention, the solid electrolyte may be used in a condition in which a mixture consisting of said polymer, the electrolyte salt and the solvent (referred to as "solid electrolyte composition" hereinafter) is coated on an electrode material and crosslinked by radioactive ray irradiation and/or heating to form a solid electrolyte layer. However, it is preferred to used by being united with an electrode active material to form a composite electrode. In this case, the actual surface area of the active material contacted to the electrolyte layer (separator) and the current collector can be increased and thus a highly efficient electrode having an improved cycle characteristic can be obtained.

A typical constitution of the galvanic cell is such that a solid electrolyte combined with a positive electrode active material, which is obtained by mixing the trifunctional terminal acryloyl-modified alkylene oxide polymer with an electrolyte salt, a solvent and the positive electrode active material and crosslinking it by radioactive ray irradiation and/or heating, is used as a composite positive electrode and, between the positive electrode and a negative electrode, an electrode prepared by crosslinking a mixture of said trifunctional terminal acryloyl-modified alkylene oxide polymer, the electrolyte salt, the solvent and the positive electrode active material by radioactive ray irradiation and/or by heating is placed as a separator.

By using as a separator a layer of the solid electrolyte (ionic conductive polymer) prepared by mixing the trifunctional terminal acryloyl-modified alkylene oxide polymer with an electrolyte salt and a solvent and crosslinking it, the formation of lithium dendrite near the negative electrode can be prevented and a separator excellent in mechanical strength and stable thermally and electrochemically can be provided.

The "trifunctional terminal acryloyl-modified alkylene oxide polymer", that is the material for the solid electrolyte used in the galvanic cell of the present invention, is a compound prepared by a procedure in which a compound having three active hydrogens such as glycerol and trimethylolpropane is used as the starting material and alkylene oxides are polymerized with it by ring-opening and the resultant trifunctional alkylene oxide polymer is esterified by an unsaturated organic acid such as acrylic acid or methacrylic acid or subjected to a dehydrochlorinating reaction with an acid chloride such as acrylic chloride or methacrylic chloride, and typically exemplified by a compound represented by the following formula (2):

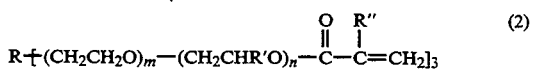

(2)

where R is a residue of a trifunctional starting material, R' is an alkyl group having 1 to 6 carbon atoms, R" is hydrogen or methyl group and m and n are respectively a number of 0 or at least 1 and m+n≧35.

The alkylene oxides used for the synthesis of the trifunctional alkylene oxide polymer include, for example, ethylene oxide, propylene oxide, butylene oxide, 1,2-epoxyhexane, 1,2-epoxyoctane and the like. Particularly preferred are ethylene oxide, propylene oxide and butylene oxide. The monomer unit number is required to be not less than 35 per each functional polymer chain of the trifunctional alkylene oxide polymer, that is, per each polyalkylene oxide chain.

In the case the monomer unit number is less than 35, it is difficult to crosslink by mixing the solvent in the trifunctional terminal acryloyl-modified alkylene oxide polymer in an amount not less than 220 weight % based on the polymer and thus the mechanical property is remarkably poor and bleed-out of the solvent to the surface of the crosslinked product is remarkable.

As the "solvent" used for the solid electrolyte of the galvanic cell of the present invention, any of those compatible with the trifunctional terminal acryloyl-modified alkylene oxide polymer can be used preferably. There are most preferably used at last one selected from the group consisting of ethylene carbonate, propylene carbonate, γ-butyrolactone, dimethoxyethane, dimethylsulfoxide, dioxolane, sulfolane and water.

The ratio of the solvent to the trifunctional terminal acryloyl-modified alkylene oxide polymer is 220 to 950 weight %. In the case it is lower than 220 weight %, the conductivity of the resultant solid electrolyte is low. When it exceeds 950 weight %, the mechanical strength of the impregnated product is remarkably lowered.

The "electrolyte salt" used for the solid electrolyte of the galvanic cell of the present invention is at least one selected from the group consisting of lithium fluoride, lithium chloride, lithium bromide, lithium iodide, lithium nitrate, lithium thiocyanate, lithium perchlorate, lithium trifluoromethanesulfonate, lithium tetrafluoroborate, lithium bistrifluoromethylsulfonylamide, lithium tristrifluoromethylsulfonylmethide, sodium thiocyanate, sodium perchlorate, sodium trifluoromethanesulfonate, sodium tetrafluoroborate, potassium thiocyanate, potassium perchlorate, potassium trifluoromethanesulfonate, potassium tetrafluoroborate, magnesium thiocyanate, magnesium perchlorate and magnesium trifluoromethanesulfonate. The amount of said electrolyte salt is preferably 1 to 30 weight % based on said solvent.

The solid electrolyte used in the galvanic cell of the present invention can be prepared by a procedure in which a uniform liquid mixture containing the trifunctional terminal acryloyl-modified alkylene oxide polymer, the electrolyte salt and the solvent is coated on a substrate uniformly by a knife coater, a gravure coater or a spin coater and then crosslinked by irradiation of high energy electromagnetic wave such as ultraviolet ray, visible ray and electron ray or by heating. The liquid mixture may be prepared by a procedure in which the solvent previously containing dissolved electrolyte salt is mixed uniformly with the trifunctional terminal acryloyl-modified alkylene oxide polymer or by a procedure in which the solvent is mixed uniformly with the trifunctional terminal acryloyl-modified alkylene oxide polymer and then the electrolyte salt is dissolved.

To the liquid mixture, if required, photopolymerization initiators such as trimethylsilylbenzophenone, benzoin, 2-methylbenzoin, 4-methoxybenzophenone, benzoin methyl ether and anthraquinone; and polymerization initiators such as benzoyl peroxide and methy ethyl ketone peroxide may be added.

As mentioned above, it is preferred the composite electrode is formed by being united with the electrode active material. However, in this case, it is preferred that the uniform liquid mixture (solid electrolyte composition) containing the trifunctional terminal acryloyl-modified alkylene oxide polymer, the electrolyte salt and the solvent is mixed with the electrode active material and the polymer is crosslinked by irradiation of radioactive ray and/or by heating. In the procedure, carbons such as graphite, carbon black and acetylene black and electron conductive substances such as metal powders and conductive metal oxides may be also used together.

The ratio of the solid electrolyte to the electrode active material can be selected properly according to the electrode active material. For example, it is preferred, in a galvanic cell utilizing intercalation of a layer compound, near the point where the ionic conductivity of the electrolyte becomes to be maximum. Also in a galvanic cell utilizing the doping phenomenon, it is required that the ion concentration in the electrolyte follows the change by charge and discharge.

In the galvanic cell of the present invention, it is preferred that the solid electrolyte composition (or a mixture thereof with an electrode active material) is coated on the surface of the electrode material and crosslinked to form a uniform solid electrolyte layer (or a composite electrode) on the electrode surface. In this case, any of known coating means such as roll coating, doctor blade coating, spin coating, bar coating and cast coating can be applied.

Among the positive electrode active materials used in the composite positive electrode, there are included the following cell electrode materials, such as group I metal compounds, e.g., $CuO$, $Cu_2O$, $Ag_2O$, $CuS$ and $CuSO_4$; group IV metal compounds, e.g., $TIS_2$, $SiO_2$ and $SnO$; group V metal compounds, e.g., $V_2O_5$, $V_6O_{12}$, $VO_x$, $Nb_2O_5$, $Bi_2O_3$ and $Sb_2O_3$; group VI metal compounds, e.g., $CrO_3$, $Cr_2O_3$, $MoO_3$, $WO_3$ and $SeO_2$; group VII metal compounds, e.g., $MnO_2$ and $Mn_2O_3$; group VIII metal compounds, e.g., $Fe_2O_3$, $FeO$, $Fe_3O_4$, $Ni_2O_3$, $NiO$, $CoO_3$ and $CoO$; or metal compounds, e.g., lithium-cobalt composite oxides and lithium-manganese composite oxides represented by the general formulae: $Li_x MX_2$ and $Li_x MN_y X_2$, where M and N are respectively a metal of group I to group VIII and X is a chalcogen element such as oxygen and sulfur; and conductive high molecular compounds and carbonaceous materials of pseudographite structure, e.g., polypyrrole, polyaniline, polyparaphenylene, polyacetylene and polyacene. However, they are not restricted to them.

Generally used as the negative electrode active materials in the negative electrode of the galvanic cell of the present invention are lithium metal and lithium metal-containing alloys such as lithium-aluminum alloy, lithium-lead, lithium-tin, lithium-aluminum-tin, lithium-gallium and Wood's metal. However, they are not restricted to them. Alkali metals such as sodium metal and their alloys and conductive polymers capable of cationic doping such as polyacetylene and polythiophene can be also used. They can be used each alone or in combination of at least two.

As the negative electrode active materials which is mixed with the solid electrolyte composition and cured to form the composite negative electrode, there may be used those exemplified as the negative electrode active material used in the negative electrode and the carbonaceous materials such as carbon. Of course, they are not restricted to them and they can be used each alone or in combination of at least two. It is preferred that said carbonaceous material is a carbon powder (average particle size: not less than 15 $\mu$m) which is analyzed to be Lattice spacing (d002): 3.35 to 3.20 Å
Size of the crystallite to axis a direction: $La \geq 200$ Å
Size of the crystallite to axis c direction: $Lc \geq 200$ Å
True density: 2.35 to 2.25 g/cm$^3$ by X-ray diffraction or the like, and prepared by baking an isotropic pitch at a temperature not lower than 2000° C., or carbon fiber.

A dispersing agent and a dispersing medium may be added in the preparation of the composite positive electrode and/or the composite negative electrode to give a uniform dispersion mixture. A thickener, a filler and an adhesion assistant can be also added.

Furthermore, as a positive collector plate, such a materials as aluminum, stainless steel, titanium or copper is preferably used, and as a negative collector plate, such a material as stainless steel, iron, nickel or copper is preferably used.

BRIEF DESCRIPTION OF THE DRAWINGS

In FIG. 1, (1) is a positive collector plate, (2) is a composite positive electrode, (3) is a solid electrolyte, (4) is a negative electrode, (5) is a negative collector plate and (6) is a sealing material. In FIG. 2, (11) is a collector, (12) is a positive electrode, (13) is a solid electrolyte, (14) is a negative electrode, (15) is a collector, (16) is a lead wire for the positive electrode and (17) is a lead wire for the negative electrode.

BEST MODE FOR EMBODYING THE INVENTION

Figure 1:
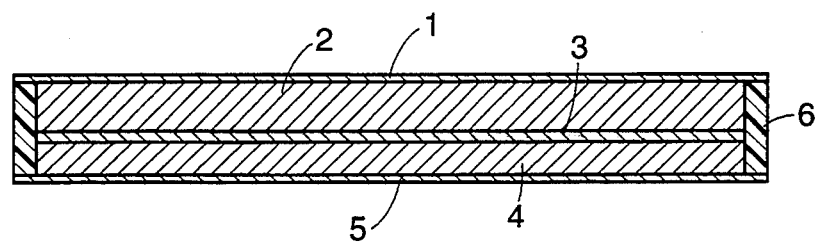
FIG. 1 is a sectional view of an example of the sheet cell of the present invention.

The present invention will be illustrated in more details by Examples and Comparative Examples. However, the present invention is not restricted to them.

[Synthetic Examples of trifunctional terminal acryloyl-modified alkylene oxide polymers]

SYNTHETIC EXAMPLE 1 (Compound A-1)

In a 7 l autoclave, 92 g of glycerol (staring material), 9.5 g of potassium hydroxide (catalyst) and 4,700 g of ethylene oxide were fed and they were reacted together at 130° C. for 5 hours and then neutralized and desalted to give 610 g of a trifunctional ethylene oxide polymer.

Its molecular weight was 4,270 (calculated from its hydroxyl number).

In a 2 l four-necked flask, 944 g (0.2 mole) of the above trifunctional ethylene oxide polymer, 65 g (0.9 mole) of acrylic acid, 500 g of toluol and 2 g of concentrated sulfuric acid as the catalyst were fed and reacted together under stirring while water was distilled off under refluxing for 10 hours. Then the reacted composition was neutralized and desalted, and toluol was distilled off to obtain an objective trifunctional terminal acryloyl-modified ethylene oxide polymer. Its molecular weight was 4,890 (calculated from GPC).

SYNTHETIC EXAMPLE 2 (Compound A-2)

In a 7 l autoclave, 92 g of glycerol, 15.0 g of potassium hydroxide, 3,700 g of ethylene oxide and 1,240 g of propylene oxide were fed and they were reacted together at 115° C. for 7 hours and then neutralized and desalted to obtain 4,990 g of a trifunctional ethylene oxide-propylene oxide random copolymer. Its molecular weight was 5,020 (calculated from its hydroxyl number).

In a 2 l four-necked flask, 1,004 g (0.2 mole) of the above trifunctional ethylene oxide-propylene oxide random copolymer, 65 g (0.9 mole) of acrylic acid, 500 g of toluol and 3 g of concentrated sulfuric acid as the catalyst were fed and reacted together while water was distilled off under refluxing for 10 hours. Then the reacted composition was neutralized and desalted, and toluol was distilled off to obtain an objective trifunctional terminal acryloyl-modified ethylene oxide-propylene oxide random copolymer. Its molecular weight was 5,180 (calculated from GPC).

SYNTHETIC EXAMPLE 3 (Compound A-3)

A trifunctional terminal acryloyl-modified ethylene oxide-propylene oxide random copolymer having a molecular weight of 7,290 (calculated from GPC) was prepared by the same manner as in Synthetic Example 2 except that the used amount of ethylene oxide and propylene oxide used was varied as shown in Table 1.

SYNTHETIC EXAMPLE 4 (Compound A-4)

In a 20 l autoclave, 92 g of glycerol, 46 g of potassium hydroxide, 7,950 g of ethylene oxide and 5,250 g of propylene oxide were fed, reacted together at 115° C. for 10 hours, then neutralized and desalted to obtain 13,270 g of a trifunctional ethylene oxide-propylene oxide random copolymer. Its molecular weight was 13,260 (calculated from its hydroxyl number).

In a 3 l four-necked flask, 1,326 g (0.1 mole) of the above trifunctional ethylene oxide-propylene oxide random copolymer, 32.5 g (0.45 mole) of acrylic acid, 1000 g of toluol and 10 g of paratoluenesulfonic acid as the catalyst were fed and reacted together under stirring for 12 hours while water was distilled off under refluxing. Then the reacted composition was and then neutralized and desalted, and toluol was distilled off to obtain an objective trifunctional terminal acryloyl-modified ethylene oxide-propylene oxide random copolymer. Its molecular weight was 13,420 (calculated from GPC).

SYNTHETIC EXAMPLE 5 (Compound A-5)

In a 20 l autoclave, 92 g of glycerol, 51 g of potassium hydroxide, 3,980 g of ethylene oxide and 10,500 g of propylene oxide were fed, reacted together at 115° C. for 12 hours, then neutralized and desalted to obtain 14,500 g of a trifunctional ethylene oxide-propylene oxide random copolymer. Its molecular weight was 14,520 (calculated from its hydroxyl number).

In a 3 l four-necked flask, 1,452 g (0.1 mole) of the above trifunctional ethylene oxide-propylene oxide random copolymer, 32.5 g (0.45 mole) of acrylic acid, 1000 g of toluol and 10 g of paratoluenesulfonic acid were fed and reacted together under stirring for 10 hours while water was distilled off under refluxing. Then the reacted composition was neutralized and desalted, and toluol was distilled off to obtain an objective trifunctional terminal acryloyl-modified ethylene oxide-propylene oxide random copolymer. Its molecular weight was 14,680 (calculated from GPC).

SYNTHETIC EXAMPLE 6 (Compound A-6)

In a 30 l autoclave, 134 g of trimethylolpropane (starting material), 68 g of potassium hydroxide and 10,600 g of ethylene oxide were fed and reacted together at 140° C. for 11 hours. Then, 8,800 g of propylene oxide was added and the mixture was further reacted together at 110° C. for 15 hours, then neutralized and desalted to obtain 19,500 g of a trifunctional ethylene oxide-propylene oxide block copolymer. Its molecular weight was 19,420 (calculated from its hydroxyl number).

In a 3 l four-necked flask, 1,942 g (0.1 mole) of the above trifunctional ethylene oxide-propylene oxide block copolymer, 39 g (0.45 mole) of methacrylic acid, 1,200 g of toluol and 20 g of paratoluenesulfonic acid as the catalyst were fed and reacted together under stirring for 10 hours while water was distilled off under refluxing. Then the reacted composition was neutralized and desalted, and toluol was distilled off to obtain an objective trifunctional terminal acryloyl-modified ethylene oxide-propylene oxide block copolymer. Its molecular weight was 19,630 (calculated from GPC).

SYNTHETIC EXAMPLE 7 (Compound A-7)

A trifunctional terminal acryloyl-modified propylene oxide polymer having a molecular weight of 8,970 (calculated from GPC) was prepared in the same manner as in Synthetic Example 2 except that propylene oxide was used alone as the alkylene oxide as shown in Table 1.

SYNTHETIC EXAMPLE 8 (Compound A-8)

In a 20 l autoclave, 134 g of trimethylolpropane (starting material), 48 g of potassium hydroxide and 11,900 g of butylene oxide were fed and reacted together at 120° C. for 18 hours. Then, the mixture was neutralized and desalted to obtain 12,000 g of a trifunctional butylene oxide polymer. Its molecular weight was 12,030 (calculated from its hydroxyl number).

In a 3 l four-necked flask, 1,203 g (0.1 mole) of the above trifunctional butylene oxide-propylene oxide block copolymer, 33 g (0.46 mole) of acrylic acid, 1,500 g of toluol and 30 g of paratoluenesulfonic acid as the catalyst were fed and reacted together under stirring for 10 hours while water was distilled off under refluxing. Then the reacted composition was neutralized and desalted, and toluol was distilled off to obtain an objective trifunctional terminal acryloyl-modified butylene oxide polymer. Its molecular weight was 12,200 (calculated from GPC).

SYNTHETIC EXAMPLE 9 (Compound A-9)

A trifunctional terminal acryloyl-modified ethylene oxide-butylene oxide random copolymer having a molecular weight of 7,700 (calculated from GPC) was prepared in the same manner as in Synthetic Example 2 except that ethylene oxide and butylene oxide were used as the alkylene oxides as shown in Table 1.

SYNTHETIC EXAMPLE 10 (Compound A-10)

In a 10 l autoclave, 92 g of glycerol, 24 g of potassium hydroxide, 6,970 g of propylene oxide and 1,100 g of butylene oxide were fed and reacted together at 110° C. for 15 hours. After the reaction has been completed, the mixture was neutralized and desalted to obtain 8,100 g of a trifunctional propylene oxide-butylene oxide random copolymer. Its molecular weight was 8,145 (calculated from its hydroxyl number).

In a 3 l four-necked flask, 814.5 g (0.1 mole) of the above trifunctional propylene oxide-butylene oxide random copolymer, 39 g (0.45 mole) of methacrylic acid, 1,000 g of toluol and 5 g of sulfuric acid as the catalyst were fed and reacted together under stirring for 10 hours while water was distilled off under refluxing. Then the reacted composition was neutralized and desalted, and toluol was distilled off to obtain an objective trifunctional terminal methacryloyl-modified propylene oxide-butylene oxide random copolymer. Its molecular weight was 8,360 (calculated from GPC).

SYNTHETIC EXAMPLE 11 (Compound B-1: Comparative Example)

In a 5 l autoclave, 92 g of glycerol, 11 g of potassium hydroxide, 2,640 g of ethylene oxide and 870 g of propylene oxide were fed and reacted together at 115° C. for 8 hours. Then, the mixture was neutralized and desalted to obtain 3,580 g of a trifunctional ethylene oxide-propylene oxide random copolymer. Its molecular weight was 3,600 (calculated from its hydroxyl number).

In a 2 l four-necked flask, 720 g (0.2 mole) of the above trifunctional ethylene oxide-propylene oxide random copolymer, 65 g (0.9 mole) of acrylic acid, 1,000 g of toluol and 5 g of paratoluenesulfonic acid as the catalyst were fed and reacted together under stirring for 10 hours while water was distilled off under refluxing. Then the reacted composition was neutralized and desalted, and toluol was distilled off to obtain an objective trifunctional terminal acryloyl-modified ethylene oxide-propylene oxide random copolymer. Its molecular weight was 3,760 (calculated from GPC).

SYNTHETIC EXAMPLE 12 (Compound B-2: Comparative Example)

In a 5 l autoclave, 134 g of trimethylolpropane, 5.4 g of potassium hydroxide, 1,320 g of ethylene oxide and 350 g of propylene oxide were fed and reacted together at 115° C. for 5 hours. Then, the mixture was neutralized and desalted to obtain 1,790 g of a trifunctional ethylene oxide-propylene oxide random copolymer. Its molecular weight was 1,800 (calculated from its hydroxyl number).

In a 3 l four-necked flask, 900 g (0.5 mole) of the above trifunctional ethylene oxide-propylene oxide random copolymer, 162 g (2.25 mole) of acrylic acid, 1,000 g of toluol and 5 g of paratoluenesulfonic acid as the catalyst were fed and reacted together under stirring for 10 hours while water was distilled off under refluxing. Then the reacted composition was neutralized and desalted, and toluol was distilled off to obtain an objective trifunctional terminal acryloyl-modified ethylene oxide-propylene oxide random copolymer. Its molecular weight was 1,960 (calculated from GPC).

SYNTHETIC EXAMPLE 13 (Compound B-3: Comparative Example)

In a 10 l autoclave, 92 g of glycerol, 20 g of potassium hydroxide, 1,352 g of ethylene oxide and 4,330 g of butylene oxide were fed and reacted together at 115° C. for 11 hours. Then, the mixture was neutralized and desalted to obtain 5,730 g of a trifunctional ethylene oxide-butylene oxide random copolymer. Its molecular weight was 5,740 (calculated from its hydroxyl number).

In a 2 l four-necked flask, 574 g (0.1 mole) of the above trifunctional ethylene oxide-butylene oxide random copolymer, 39 g (0.45 mole) of methacrylic acid, 1,000 g of toluol and 5 g of sulfuric acid as the catalyst were fed and reacted together under stirring for 10 hours while water was distilled off under refluxing. Then the reacted composition was neutralized and desalted, and toluol was distilled off to obtain an objective trifunctional terminal methacryloyl-modified ethylene oxide-butylene oxide random copolymer. Its molecular weight was 5,930 (calculated from GPC).

The constitutions of trifunctional terminal acryloyl-modified alkylene oxide polymers prepared by each Synthetic Examples are shown in Table 1.

TABLE 1

| Compound | Starting*1 material | Monomer*2 EO | PO | BO | Monomer arrangement*3 | Terminal acryloyl group*4 | M.W.*5 ① | ② |
|---|---|---|---|---|---|---|---|---|
| A-1 | G | 35 | — | — | H | A | 4,720 | 4,980 |
| A-2 | G | 28 | 7 | — | R | A | 5,020 | 5,180 |
| A-3 | G | 40 | 10 | — | R | A | 7,130 | 7,290 |
| A-4 | G | 60 | 30 | — | R | A | 13,260 | 13,420 |
| A-5 | G | 30 | 60 | — | R | A | 14,520 | 1,420 |
| A-6 | T | 80 | 50 | — | B | M | 19,420 | 19,630 |
| A-7 | G | — | 50 | — | H | A | 8,810 | 8,970 |
| A-8 | T | — | — | 55 | H | A | 12,030 | 12,200 |
| A-9 | G | 40 | — | 10 | R | A | 7,540 | 7,700 |
| A-10 | G | — | 40 | 5 | R | M | 8,145 | 8,360 |
| B-1 | G | 20 | 5 | — | R | A | 3,600 | 3,760 |
| B-2 | T | 10 | 2 | — | R | A | 1,800 | 1,960 |

TABLE 1-continued

| Com- pound | Starting*[1] material | Monomer*[2] EO | PO | BO | Monomer arrange- ment*[3] | Terminal acryloyl group*[4] | M.W.*[5] ① | ② |
|---|---|---|---|---|---|---|---|---|
| B-3 | G | 10 | — | 20 | R | M | 5,740 | 5,930 |

Note)
*[1](G) shows glycerol, and (T) shows trimethylolpropane.
*[2](EO) shows ethylene oxide, (PO) shows propylene oxide and (BO) shows butylene oxide. The figures show the monomer unit number per polyalkylene oxide chain.
*[3](H) shows a homopolymer of an alkylene oxide, (R) shows a random copolymer and (B) shows a block copolymer.
*[4](A) shows an acrylate and (M) shows a methacrylate.
*[5]① shows the molecular weight before acryloyl-modified and ② shows the molecular weight after acryloyl-modified.

[Synthetic Example of an positive electrode active material]

To a 1 l four-necked flask equipped by a stirrer, a thermometer, a cooling tube and a dropping funnel, 20 g of aniline, 18 ml of hydrochloric acid and 250 ml of water were added. They were cooled to 0° C. and then a solution prepared by dissolving 49 g of ammonium sulfate in 120 g of water was dropped from a dropping funnel over 4 hours. After dropped, the mixture was further stirred for 1 hour. Then, the precipitate was filtered and washed with water until the washing becomes neutral and then washed with ethanol until the washing becomes transparent. The washed product was dried in vacuo to give 10.2 g of dedoped polyaniline. 10 g of the dedoped polyaniline was dissolved in 300 g of N-methyl-2-pyrrolidone and reduced by adding 2 g of phenylhydrazine. After the reaction has been completed, it was reprecipitated from acetone and the deposited solid was filtered and washed with acetone and dried to give 8.0 g of a grey positive electrode active material (referred to as "reduced polyaniline").

[Preparative Examples of the cell]

EXAMPLE 1

8 g of reduced polyaniline was used as the positive electrode active material. To it, 2 g of a solid electrolyte composition before crosslinked comprising 1 part by weight of the trifunctional terminal acryloyl-modified ethylene oxide polymer (Compound A-1), 4 parts by weight of propylene carbonate and 0.4 part by weight of lithium perchlorate and 2 g of carbon black (Ketchen Black EC600J) were added, and the mixture was pulverized and mixed well in a ball mill under nitrogen atmosphere and then spread on a stainless steel plate of 2 μm thick and 12 mm diameter and crosslinked by using an electrocurtain electron beam irradiation equipment (Output: 200 KV, Exposure: 5 Mrad) to prepare a positive electrode of 30 μm thick. The solid electrolyte composition before crosslinked mentioned above was further applied on the positive electrode by a wire coater and crosslinked by using an electron beam irradiation equipment in the same manner as mentioned above to form a solid electrolyte layer of 50 μm thick.

Figure 2:
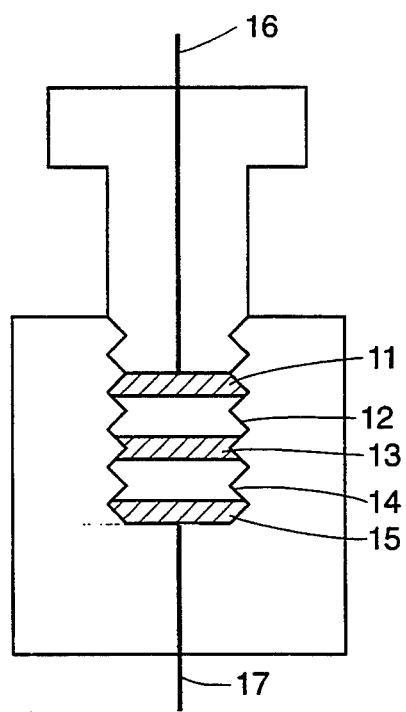
FIG. 2 is an outlined view of a test cell for evaluating the characteristics of the galvanic cell of the present invention.

Then, the above solid electrolyte layer was adhered to a metal lithium tip (50 μm thick, 12 mm diameter) and enclosed in a fluororesin cell shown in FIG. 2 to prepare a new lithium cell. As the result of the measurement, the open voltage of the cell was 3.4 V and the discharge capacity was 110 mA·h/g. By the way, these characteristics compares with the existing lithium cell using a liquid electrolyte.

EXAMPLES 2 to 9 AND COMPARATIVE EXAMPLES 1 AND 2

Cells were prepared in the same manner as in Example 1 except that the compositions of the solid electrolyte were varied as shown in Table 2. The characteristics of the resultant cells are shown in Table 2.

TABLE 2

| | Composition of solid electrolyte before crosslinked (g) | | | Initial characteristics | |
|---|---|---|---|---|---|
| Sample | Compound*[1] | Solvent*[2] | Electro- lyte salt | Open voltage (V) | Discharge capacity (mA · h/g) |
| Examples | | | | | |
| 2 | A-2 (1) | PC (6) | LiClO₄ (1.1) | 3.5 | 120 |
| 3 | A-3 (1) | PC/DME (2/4) | LiBF₄ (2.0) | 3.6 | 125 |
| 4 | A-4 (1) | GBL (9) | LiSCN (0.9) | 3.4 | 120 |
| 5 | A-5 (1) | PC (2.5) | LiClO₄ (0.2) | 3.3 | 121 |
| 6 | A-6 (1) | PC (9.5) | LiCF₃SO₃ (2.1) | 3.4 | 130 |
| 7 | A-7 (1) | EC (5) | LiClO₄ (0.5) | 3.5 | 124 |
| 8 | A-8 (1) | SL (2.5) | LiClO₄ (0.2) | 3.1 | 122 |
| 9 | A-9 (1) | EC (4) | LiClO₄ (0.6) | 3.5 | 124 |
| Comparative Example | | | | | |
| 1 | A-1 (1) | PC (1) | LiClO₄ (0.1) | 3.0 | 40 |
| 2 | A-2 (1) | PC (2) | LiClO₄ (0.1) | 3.1 | 38 |

Note)
*[1]Same as in Table 1.
*[2]PC shows propylene carbonate, DME shows dimethoxyethane, GBL shows γ-butyrolactone, EC shows ethylene carbonate and SL shows sulfolane.

COMPARATIVE EXAMPLE 3

It was tried to prepare a positive electrode by the same manner as in Example 1 except that Compound B-1 was used instead of Compound A-1. However, it could not be completely crosslinked. Though the crosslinking was tried by using the solid electrolyte composition before crosslinked alone, it failed to be a solid electrolyte and no cell could be prepared from it.

COMPARATIVE EXAMPLE 4

It was tried to prepare a positive electrode by the same manner as in Example 1 except that Compound B-2 was used instead of Compound A-1 and the used amount of propylene carbonate was varied to 3 parts by weight. In this case, the same result as in Comparative Example 3 was obtained.

COMPARATIVE EXAMPLE 5

It was tried to prepare a cell by the same manner as in Example 1 except that Compound B-3 was used instead of Compound A-1 and the used amount of propylene carbonate was varied to 3 parts by weight. However, liquid leakage from the cell was observed and no cell of practical use could be prepared.

EXAMPLE 10

A sheet cell of the present invention was prepared according to the procedure shown in the following a) to c).

a) A mixture X of manganese dioxide (positive electrode active material) and acetylene black (conductor) in a ratio of 85:15 (by weight) and a mixture Y of Compound A-3, lithium perchlorate, propylene carbonate and azobisisobutyronitrile in a ratio of 10:1:25:0.05 (by weight) were prepared. The mixtures were mixed together under dry inert gas atmosphere in a ratio of 10:3 (by weight).

Then, this mixture was cast-coated on a collector prepared by forming a conductive carbon film on the surface of a positive collector plate comprising stainless steel and cured by being stood at 100° C. for 1 hour to obtain a composite positive electrode. The thickness of the composite positive electrode film formed on the positive collector plate was 60 $\mu$m.

b) Lithium metal was used as the negative electrode active material and it was pressed on a negative collector plate consisting of stainless steel.

Then, on the lithium metal, a mixture of Compound A-3, lithium perchlorate, propylene carbonate and azobisisobutyronitrile in a ratio of 30:6:150:0.5 (by weight) was cast-coated and cured by being stood at 100° C. for 1 hour under dry inert gas atmosphere. The thickness of the solid electrolyte thus prepared was 20 $\mu$m.

c) The solid electrolyte/lithium/negative collector plate prepared by b) was contacted with the positive collector plate/composite positive electrode prepared by a) to prepare a sheet cell shown in FIG. 1.

In FIG. 1, (1) is a positive collector plate consisting of stainless steel which also serves as a housing, (2) is a composite electrode by using the solid electrolyte of the present invention, (3) is the solid electrolyte of the present invention, (4) is a negative electrode consisting of lithium metal, (5) is a negative collector plate consisting of stainless steel (which also serves as a housing), and (6) is a sealing material consisting of a modified polypropylene.

COMPARATIVE EXAMPLE 6

A sheet cell was prepared in the same manner as in Example 10 except that polyethylene glycol triacrylate was used instead of Compound A-1.

Figure 3:
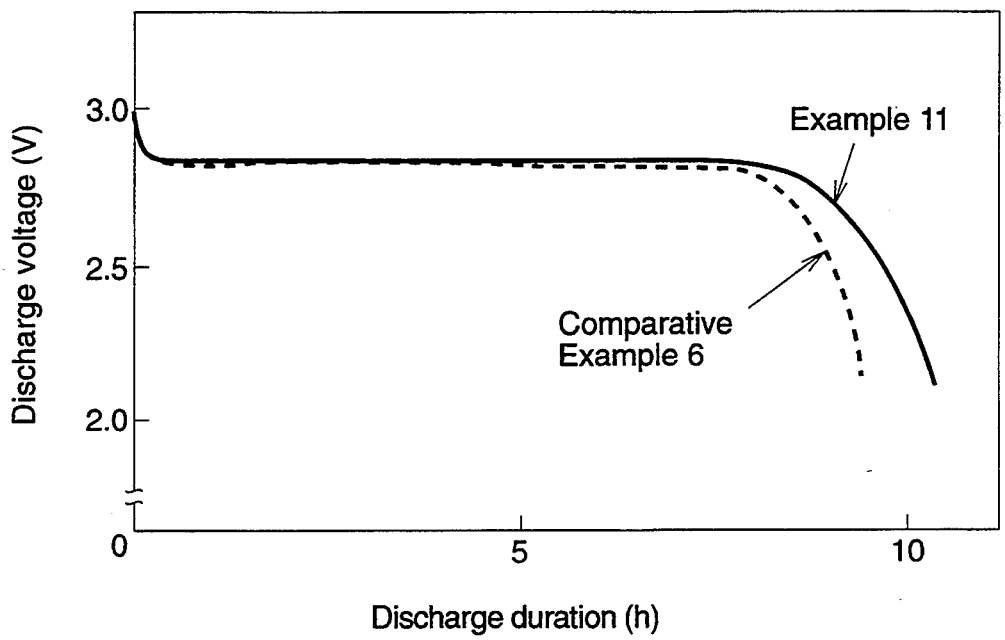
FIG. 3 is a diagram showing the initial discharge characteristics of the sheet cell prepared in Example 10 and Comparative Example 6 when discharged at 25° C. and 0.1 mA/cm$^2$.
Figure 4:
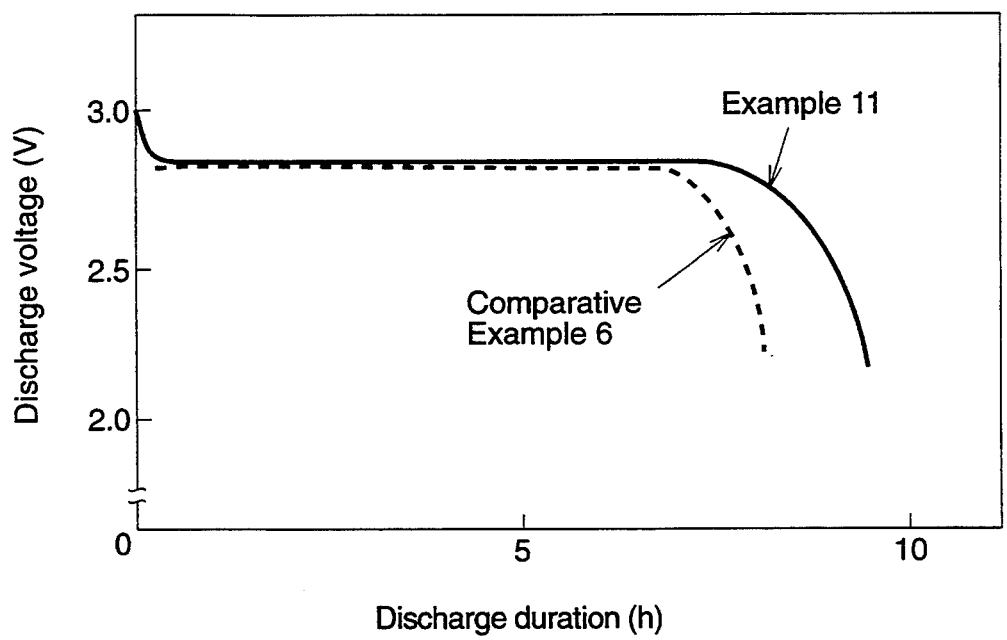
FIG. 4 is a diagram showing the initial discharge characteristics of the sheet cell prepared in Example 10 and Comparative Example 6 when discharged at 25° C. and 0.1 mA/cm$^2$ and stored at 60° C. for 100 days.

Though the electrode areas of the sheet cells in Example 10 and Comparative Example 6 could be varied by the procedure, those having an electrode area of 100 cm$^2$ were prepared in Example 10 and Comparative Example 6. The initial discharge characteristics when these sheet cells were discharged at 25° C. and 0.1 mA/cm$^2$ and the discharge characteristics after stored at 60° C. for 100 days were examined. FIG. 3 shows the discharge characteristics immediately after preparation of the cell (initial discharge characteristics). FIG. 4 shows the discharge characteristics after stored at 60° C. for 100 days.

As apparent from the results of FIGS. 3 and 4, the sheet cell of Example 10 of the present invention is excellent in the initial discharge characteristics and the discharge characteristics after stored at 60° C. for 100 days compared with the sheet cell of Comparative Example 6.

EXAMPLE 11

A sheet cell was prepared according to the following procedure.

a) A mixture X of vanadium pentoxide (positive electrode active material) and acetylene black (conductor) in a ratio of 85:15 (by weight) and a mixture Y of Compound A-4, lithium hexafluoroarsenate, ethylene carbonate and 2-methyltetrahydrofuran in a ratio of 10:1:10:30 (by weight) were prepared and these mixtures were mixed together in a ratio of 10:3 under a dry inert gas atmosphere.

Then, the resultant mixture was cast-coated on a collector prepared by forming a conductive carbon film on the surface of a positive collector plate and then cured by being stood at 100° C. for 1 hour under a dry inert gas atmosphere. The thickness of the composite positive electrode film formed on the positive collector plate was 60 $\mu$m.

b) Lithium metal was used as the negative electrode active material of the cell and it was pressed on a negative collector plate consisting of stainless steel.

Then, on the lithium metal, a mixture of Compound A-4, lithium hexafluoroarsenate, ethylene carbonate and 2-methyltetrahydrofuran in a ratio of 30:6:30:60 (by weight) was cast-coated and cured by being stood at 100° C. for 1 hour under dry inert gas atmosphere. The thickness of the solid electrolyte thus prepared was 20 $\mu$m.

c) A sheet cell similar to that in Example 10 was prepared by contacting the solid electrolyte/lithium/negative collector plate prepared by b) with the positive collector plate/composite positive electrode prepared by a).

COMPARATIVE EXAMPLE 7

A sheet cell was prepared in the same manner as in Example 11 except that polyethylene glycol triacrylate was used instead of Compound A-2.

Figure 5:
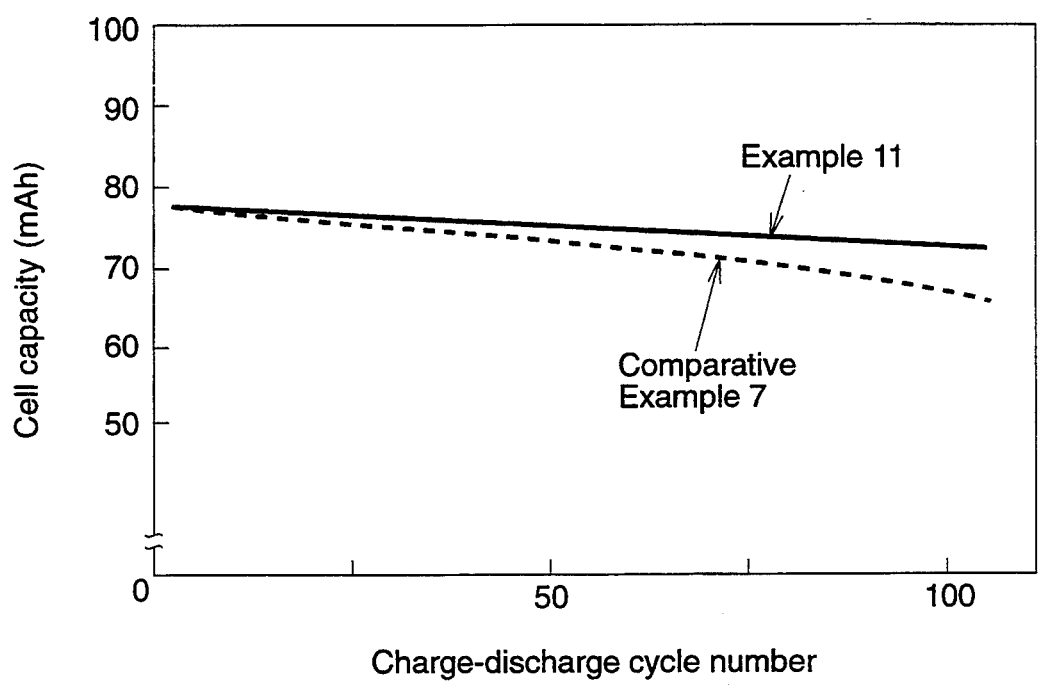
FIG. 5 is a diagram showing the relationship between the charge-discharge cycle number of sheet cells prepared in Example 11 and Comparative Example 7 at 25° C. and the cell capacity at 25° C.

Though the electrode areas of the sheet cells in Example 11 and Comparative Example 7 could be varied by the procedure, those having an electrode area of 100 cm$^2$ were prepared in the Example. By using the sheet cells, a charge and discharge cycle test at a constant current was carried out at 25° C. and 50 $\mu$A/cm$^2$. The charge and discharge cycle test was carried out at a charge terminal voltage of 3.2 V and a discharge terminal voltage of 2.0 V. FIG. 5 shows the relationship between the charge and discharge cycle number and the cell capacity.

As apparent from the result of FIG. 5, the sheet cell of Example 11 of the present invention shows an excellent charge and discharge cycle characteristics compared to the sheet cell of Comparative Example 7.

Industrial Applicability of the Invention

The cell of the present invention shows no liquid leakage feared in the case a liquid electrolyte is used and has a high electric capacity and an excellent mechanical strength and therefore can be used in a high reliability as a back-up source for electronic equipments, a watch power source, a camera power source and a pace-maker power source.

In the present invention, an electrode of very high performance can be prepared by unifying a special solid electrolyte composition with the positive electrode active material to form a composite positive electrode for use as mentioned above, as it increases the actual surface area of the active material contacting with the electrolyte layer (separator) and the collector. It is also possible to prevent the formation of lithium dendrite by using the solid electrolyte also as the electrolyte layer (separator) to give an electrolyte layer (separator) excellent in mechanical strength and thermally and electrochemically stable. Therefore, a composite electrode and an electrolyte most suitable electrochemically can be prepared and it not only improves the workability of the cell manufacturing process but also can improve the performance of the cell.

What is claimed is:

1. A galvanic cell produced by using a solid electrolyte prepared by: (a) dissolving a trifunctional polymer in a solvent together with an electrolyte salt to form a solution; and (b) crosslinking said solution by a radioactive ray irradiation and/or by heating, said solid electrolyte characterized in that said trifunctional polymer is a trifunctional terminal acryloyl-modified alkylene oxide polymer having a molecular weight of at least 5000 and comprising a polymer chain represented by the following formula (1) as each functional polymer chain,

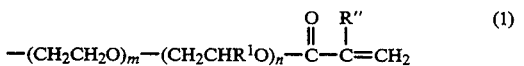

in which $R^1$ is an alkyl group having 1 to 6 carbon atoms, $R^{11}$ is hydrogen or methyl group, and m and n are respectively 0 or an integer of at least 1 and $m+n \geq 35$, and the amount of said solvent is 220 to 950 weight % based on said trifunctional terminal acryloyl-modified alkylene oxide polymer.

2. A galvanic cell according to claim 1, wherein said solid electrolyte separates a composite positive electrode from a negative electrode, said composite positive electrode is obtained by: (a) mixing said trifunctional terminal acryloyl-modified alkylene oxide polymer with said electrolyte salt, said solvent and the positive electrode active material to form a composite positive electrode mixture and; (b) crosslinking said composite positive electrode mixture by radioactive ray irradiation and/or heating.

3. A galvanic cell according to claim 2, wherein said negative electrode comprises a composite negative electrode, obtained by: (a) mixing said trifunctional terminal acryloyl-modified alkylene oxide polymer, said electrolyte salt, said solvent and a negative electrode active material to form a composite negative electrode mixture; and (b) crosslinking said composite negative electrode mixture by a radioactive ray irradiation and/or by heating.

4. A galvanic cell according to claim 2, wherein said composite positive electrode comprises a conductive material selected from the group consisting of carbons, metal powders and conductive metal oxides.

5. A galvanic cell according to claim 1, in which said solvent is at least one selected from the group consisting of ethylene carbonate, propylene carbonate, γ-butyrolactone, dimethoxyethane, dimethylsulfoxide, dioxolane, sulfolane and water.

6. A galvanic cell according to claim 1, in which said electrolyte salt is at least one selected from the group consisting of lithium fluoride, lithium chloride, lithium bromide, lithium iodide, lithium nitrate, lithium thiocyanate, lithium perchlorate, lithium trifluoromethanesulfonate, lithium tetrafluoroborate, lithium bistrifluoromethylsulfonylamide, lithium tristrifluoromethylsulfonylmethide, sodium thiocyanate, sodium perchlorate, sodium trifluoromethanesulfonate, sodium tetrafluoroborate, potassium thiocyanate, potassium perchlorate, potassium trifluoromethanesulfonate, potassium tetrafluoroborate, magnesium thiocyanate, magnesium perchlorate and magnesium trifluoromethanesulfonate.

7. A galvanic cell according to claim 1, in which said electrolyte salt is used in a ratio of 1 to 35 weight % based on said solvent.

8. A galvanic cell according to claim 3, wherein said composite negative electrode comprises a conductive material selected from the group consisting of carbons, metal powders and conductive metal oxides.

9. A galvanic cell according to claim 2, wherein said solvent is at least one selected from the group consisting of ethylene carbonate, propylene carbonate, γ-butyrolactone, dimethoxyethane, dimethylsulfoxide, dioxolane, sulfolane and water.

10. A galvanic cell according to claim 2, wherein said electrolyte salt is at least one selected from the group consisting of lithium fluoride, lithium chloride, lithium bromide, lithium iodide, lithium nitrate, lithium thiocyanate, lithium perchlorate, lithium trifluoromethanesulfonate, lithium tetrafluoroborate, lithium bistrifluoromethylsulfonylamide, lithium tristrifluoromethylsulfonylmethide, sodium thiocyanate, sodium perchlorate, sodium trifluoromethanesulfonate, sodium tetrafluoroborate, potassium thiocyanate, potassium perchlorate, potassium trifluoromethanesulfonate, potassium tetrafluoroborate, magnesium thiocyanate, magnesium perchlorate and magnesium trifluoromethanesulfonate.

11. A galvanic cell according to claim 2, wherein said electrolyte salt is used in a ratio of 1 to 35 weight % based on said solvent.

* * * * *

UNITED STATES PATENT AND TRADEMARK OFFICE
CERTIFICATE OF CORRECTION

PATENT NO. : 5,436,090
DATED : July 25, 1995
INVENTOR(S) : Michiyuki Kono, Shigeo Mori, Kazunari Takeda, Shyuiti It is certified that error appears in the above-indentified patent and that said Letters Patent is hereby corrected as shown below:

On title page, item [73], under "Assignees":

Please indicate the second Assignee as follows

Yuasa Corporation,

Osaka, Japan

Signed and Sealed this

Second Day of September, 1997

*Attest:*

BRUCE LEHMAN

*Attesting Officer*     *Commissioner of Patents and Trademarks*